April 10, 1928.  W. E. TRUMPLER  1,665,866
BALANCING MACHINE
Filed May 28, 1924   2 Sheets-Sheet 1
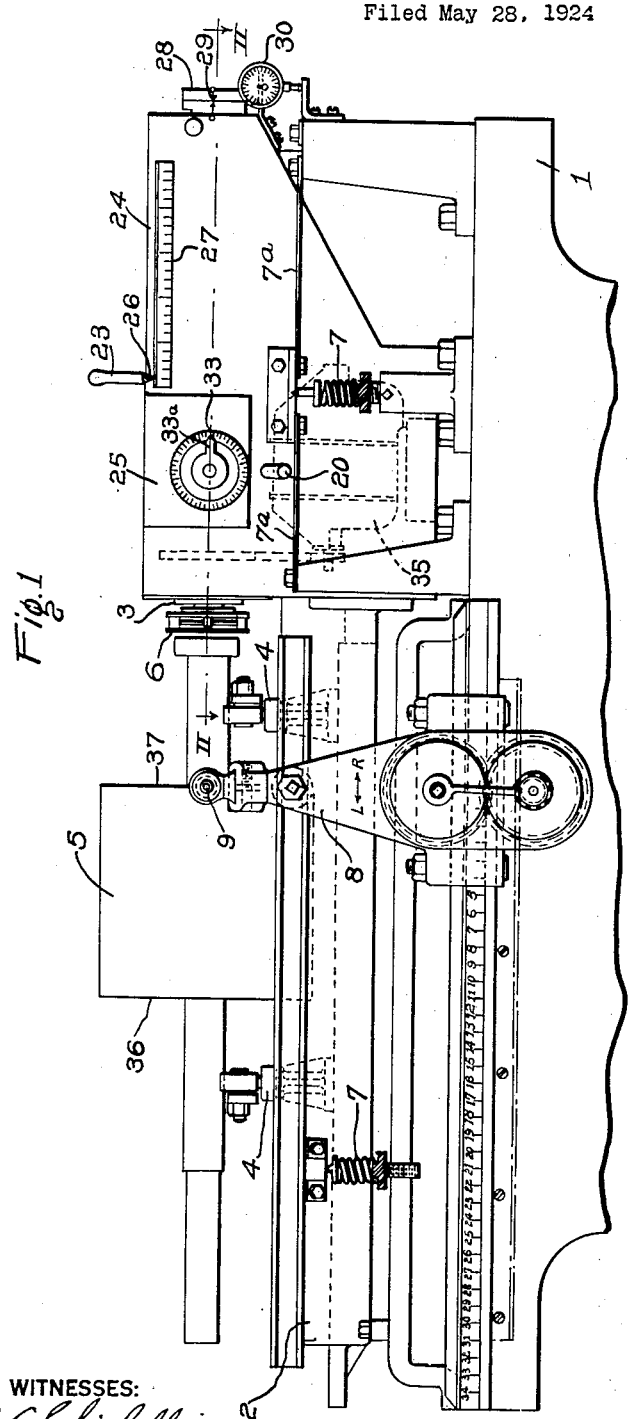
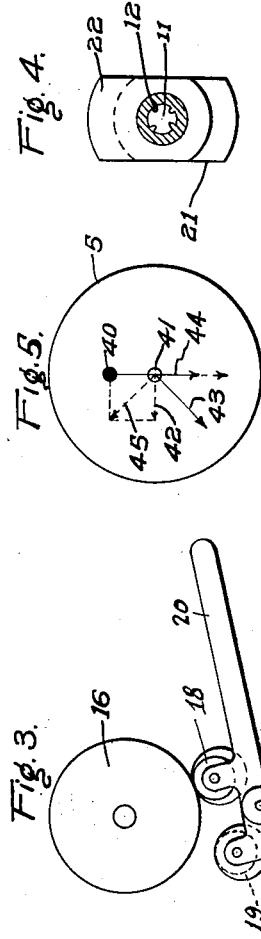
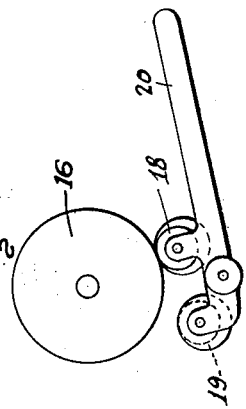
INVENTOR
William E. Trumpler.
BY
ATTORNEY

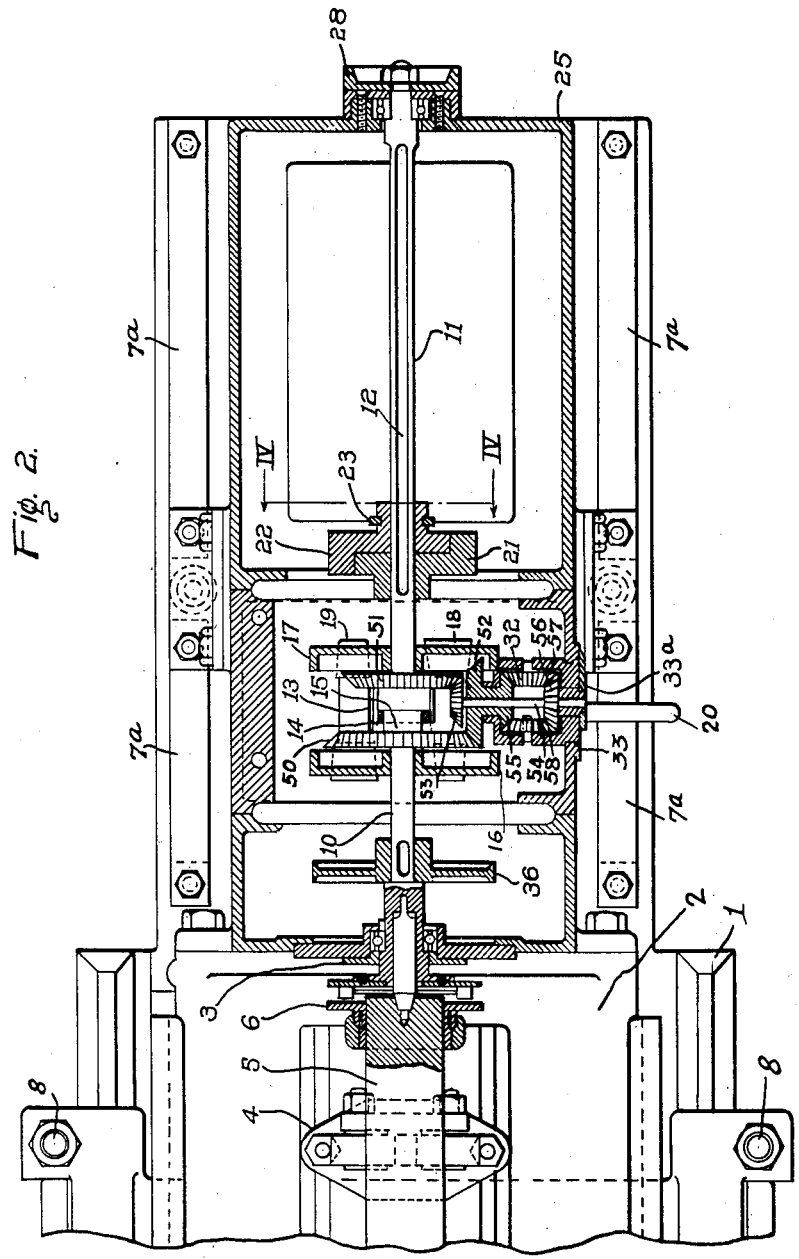

Patented Apr. 10, 1928.

1,665,866

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed May 28, 1924. Serial No. 716,331.

My invention relates to balancing machines, more particularly to a counter balancing device and means for manipulating the same to balance rotors and other bodies to be tested while they are mounted for rotation in the testing machine.

It is among the objects of my invention to provide a counter-balance mechanism which shall be of relatively simple construction, which shall be adapted to be utilized on any type of dynamic balancing machine and which shall efficiently balance the rotating objects to be tested.

It is a further object of my invention to provide a device of the above designated character which shall function to counter balance the parasite masses in rotating bodies and which shall indicate the relative amount and location of such masses in the rotor body in a simple and efficient manner.

It is a still further object of my invention to provide a counter balancing mechanism which shall expedite the balancing operation and eliminate the tedious labor heretofore involved in testing rotors for dynamic balance and which shall further obviate the need of skill and judgment of the operator necessary in the utilization of prior devices.

In a device for testing the dynamic balance of rotating bodies heretofore proposed, the body to be tested was suspended in such manner that when it was rotated it would impose an oscillatory movement to the supporting base or bed, the amplitude of which varied in accordance with the amount of inertia of the unbalanced mass from the fulcrum point of support. One method of balancing the rotating element was to determine the location of the parasite mass by adding material to or removing material from, the rotor in accordance with the best judgment of the operator until the absence of the oscillatory movement indicated a practical degree of dynamic balance in the rotor.

Another method of testing was to utilize a counter-balancing mechanism on the supporting structure, which consisted of a pair of angularly movable weights, usually in axial alinement with the axis of the rotor with means for displacing the weights during the operation of the testing mechanism to counter balance the moment produced by the unbalanced mass of the rotor and then making correction for such unbalance by removing or adding weigths on the rotor faces.

My present invention is directed to a counter balancing mechanism that is mounted as a permanent part of a dynamic balancing machine. I utilize a pair of counter balance weights that may be manipulated in such a manner as to produce a couple which offsets or counteracts the couple produced by the parasite mass in the rotor being tested, relative to the fulcrum location upon which the rotor and its support is adapted to oscillate.

My invention further provides means for determining the degree of unbalance and the location of the parasite mass relative to the end faces of the rotor, and, in general, I provide a device which is designed to facilitate the balancing of rotors by providing ready access to the manipulating elements which are located in a convenient position on the testing device.

In the accompanying drawings constituting a part hereof and in which like reference characters designate like parts:

Figure 1 is a side elevational view of a balancing machine embodying the principles of my invention, Fig. 2 is a plan view thereof, partially in section and partially in elevation, taken along the line II—II of Fig. 1, Fig. 3 is an elevational view of the manipulating device for adjusting the counter balancing members, Fig. 4 is a view, partially in section and partially in elevation, of the counter balancing weigths taken along the line IV—IV of Fig. 2, and Fig. 5 is a diagrammatic view of the rotor illustrating the couples involved in correcting the unbalanced mass.

Referring to Fig. 1, the structure therein illustrated comprises a base 1 having a movable bed 2 mounted thereon which comprises a head stock 3 and an extended bed portion provided with roller bearings 4 adapted to support a rotor 5 to be tested, which is connected to a gripping member or coupling 6, such as a chuck to the head stock 3.

The bed 2 is supported by a plurality of springs 7 and straps 7ª on the base 1 to permit vibration of the bed member, and a movable fulcrum 8 is mounted on the base 1 and adapted to be moved longitudinally of the bed 2. The fulcrum member 8 may be provided with a marking indicator 9, such as a center punch or the like, for marking the rotor 5.

Referring to Fig. 2, a shaft 10 is flexibly connected to the rotor 5, as shown, and a spline shaft 11 having a plurality of keyways 12 is journalled for rotation in axial alinement with the shaft 10 and the axis of the rotor 5. The shafts 10 and 11 are co-operatively engaged by a friction coupling member comprising a plurality of spring fingers 13 secured to the shaft 11, having felt friction pads 14 secured thereto to engage the end portion 15 of the shaft 10. A plurality of disks 16 and 17 are mounted near the ends of the shafts 10 and 11, respectively, and a pair of rollers 18 and 19 are mounted on the lever 20 in co-operative engagement with the disks 16 and 17, as shown in Fig. 3. The rollers are slightly conical so that the periphery at one end is greater than at the other to effect a differentiation in the speeds of the engaging disks 16 and 17, for the purpose hereinafter set forth.

Bevel gear-wheels 50 and 51 are secured to the shafts 10 and 11 near their adjacent ends and engaged bevel pinions 52 and 53, respectively, at equal gear ratios. The bevel pinions are mounted concentrically, the pinion 53 being secured to a shaft 54 and the pinion 52 being journaled on said shaft. Bevel gear wheels 55 and 56 are secured to the pinion 52 and to the shaft 54, respectively, and cooperate with planetary pinions 57 that are journaled in a housing 58 to constitute a differential mechanism 32. The housing 58 is rotatably mounted in the casing 25 and is provided with a dial indicator or pointer 33a that cooperates with a stationary dial 33 on the outside of the casing 25.

If the shafts 10 and 11 are rotated at the same speed, the bevel gear wheels 50 and 51 will cause the bevel pinions 52 and 53 to rotate at equal speeds but in opposite directions. Consequently, the gear wheels 55 and 56 will rotate at equal speeds and in opposite directions, thereby causing the planetary pinion 57 to rotate freely within the housing 58.

In case that the shaft 11 is displaced angularly with respect to the shaft 10 by means of the conical rollers 18 or 19, the bevel gear wheels 50 and 51 and, consequently, the gear wheels 55 and 56 will rotate at slightly different speeds. This speed differential between the gear wheels 55 and 56 will cause the planetary pinion 57 and the housing 58 to be turned within the casing 25 in accordance with the well known law of the differential mechanism.

The angular position of the housing 58 will be shown by the indicator 33a and, therefore, the angular position of the shaft 11 relative to the shaft 10 may be ascertained by reading the dial 33.

A pair of balancing weights 21 and 22 are mounted on the shaft 11, the weight 21 being rigidly secured thereto and the weight 22 having a spline connection therewith to permit of axial movement without affecting the angular position thereof. The weight 22 is engaged by a shifting yoke 23 (Figs. 1 and 2) that extends through a slotted opening 24 and terminates in a handle portion above the casing 25. The shifting yoke 23 is provided with an indicator 26 that indicates the relative position of the weight 22 on a scale 27 secured to the casing 25. The end of the shaft 11 is provided with a disk 28 having a pair of lines or graduations 29, 180° apart, which are adapted to register with similar lines on a sleeve portion of the casing member 25.

A motor 35 is mounted on the base 1 and is operatively connected to a pulley 36 mounted on the flexible shaft 10.

The operation of this device is briefly as follows: With the rotor 5 mounted in the position shown in Fig. 1, the motor 35 is energized to actuate the drive shaft 10 which rotates the rotor 5 at the desired speed. The fulcrum member 8 is moved on the ways of the base 1 in a left or right hand direction until it is in alinement with one of the diametrical planes, such as the end faces 36 or 37, of the rotor 5.

The correction for balance is based on the principle that the parasite masses, which are the unbalanced masses of the rotor, may be counter balanced by making correction in any two transverse planes of the rotor.

With the fulcrum 8 in alinement with the end face or plane 37 of the rotor, the unbalanced mass will exert itself as a moment relative to the fulcrum axis, unless the unbalance happens to fall exactly in the fulcrum plane. This moment produced by the centrifugal force of the unbalanced mass will induce a vibration or oscillatory movement of the bed 2 about the fulcrum axis and the degree of amplitude of such movement will be a function of the unbalance. By adjusting the counter-weights 21 and 22 to oppose the unbalance of the rotor, the bed will gradually come to rest.

Fig. 5 illustrates diagrammatically the location of a parasite mass 40 relative to the axis 41 of the rotor 5. The vectors 42, 43, 44 and 45 illustrate the effects of various moments produced by the balance weights 21 and 22 to counteract the moment of the mass 40. To illustrate, when the rotor is actuated by the motor 35, the unbalanced mass 40 will impose a moment about the fulcrum 8 which produces a vibratory or oscillatory movement of the bed 2, the amplitudes of which is a function of the amount of unbalance. By manipulating the hand lever 23 to move it along the scale 27, the balance weight 22 connected thereto will be shifted longitudinally along the axis of the shaft 11. The balance weight 21, being fixed on the shaft 11, remains stationary, and the resultant separation of the balanced weights will produce a couple whose moment is represented by the vector 43. The couple may oppose the moment produced by the parasite mass 40 in any degree of angularity and if this couple is favorable by being opposed to the moment of the mass 40, the oscillatory motion of the bed will be reduced.

The operator will then manipulate the hand lever 20 of the friction rolls 18 and 19 to effect creepage of the disk 17 to provide relative angular movement of the balance weights 21 and 22. This angular movement will shift the couple relative to the unbalanced mass 40 until it is opposed to the mass as shown by the vector 44. This location is indicated to the operator by a further reduction of the vibration of the bed member and, if the magnitude of such couple is equal to the moment of the mass 40, a state of balance will be reached which will be indicated by the bed member coming to rest. If this condition cannot be obtained, the operator will further manipulate the lever 23 along the scale which shortens the vector 43 to the length of the vector 44, thus bringing the rotating mass in equilibrium or a state of balance which is indicated by minimum vibration or oscillatory movement of the bed 2.

The relative location and magnitude of the couple produced by the counter balanced weight is readily determinable by the degree of vibration of the bed indicated on the dial indicator 30 and the displacement of the couple relative to the unbalanced mass to oppose said mass is produced by relatively fine adjustments through the hand lever 20. These adjustments may be made in small increments indicated by the pointer 33ª upon the dial 33, so that, if the operator exceeds the point of minimum balance, he will know, by having read the dial 33, the approximate amount in terms of graduations that he will have to retract the weights, which is accomplished by engaging the other set of cone friction members.

If, upon rotating the rotor 5 during the initial step of the balancing procedure, the couple of the weights is effective in the manner shown by the vector 42, i. e. at right angles or 90° from the parasite mass 40, the resultant force indicated by the vector 45 will be of approximately the same magnitude as the mass 40, thus effecting little variation in the degree of vibration. However, by increasing the angularity, as indicated by the vector 43, the vibration is materially reduced and the operator obtains an approximation of the relative location of the unbalanced mass and the balanced weights, so that further manipulation of the latter to balance the mass becomes a comparatively easy matter.

After balancing the rotor it will be necessary to locate the relative position of the unbalanced mass, which is accomplished by rotating the rotor until the zero mark of the disk 28 of the shaft 11 registers with the zero mark of the end portion of the casing. The rotor 5 is then marked by the center punch 9 which mark designates the longitudinal plane in which the correction for the unbalanced mass is to be made.

The fulcrum member 8 is then shifted into another diametrical transverse plane of the rotor 5, and the operation is repeated to make correction for the unbalanced mass with respect to the new fulcrum plane. Since it has been found practical to correct the dynamic unbalance of rotating bodies in two transverse planes, the correction will be made by locating the fulcrum 8 in any two desired planes which are usually the end planes or faces of the rotor, for the addition or removal of correction weights. Correction for unbalance may be made while the rotor is mounted on the balancing machine, as shown, or the rotor may be removed to a more convenient place for removing or adding the necessary material.

It is evident from the above description of my invention that the principles herein set forth provide ample and sufficient means for determining the amount and location of unbalanced masses in rotating bodies in an expedient manner which obviates the cut-and-try method heretofore utilized and permits the balancing of rotors in production quantities with uniform results and a high degree of accuracy, without depending upon the skill of the operator.

Although I have described a specific embodiment of my invention, it will be obvious to those skilled in the art that various modifications may be made in the details of construction without departing from the principles herein set forth, and, furthermore, the counter-balancing mechanism is not restricted in its use to balancing machines of the fulcrum type herein illustrated but may be applied to balancing machines of any suitable type where the unbalance is indicated by vibration induced in the supporting structure.

I claim as my invention:

1. In a balancing machine, a drive spindle, a counter-shaft, frictional coupling means therefor, a plurality of counterbalance weights associated with said counter-shaft and axially movable thereon and conical rollers for adjusting said weights angularly to balance the unbalanced mass of the body being tested.

2. In a balancing machine, a drive spindle coupled to a body to be tested, a countershaft in axial alinement therewith, frictional coupling means for said shafts, a plurality of counterbalance weights mounted on said countershaft and differential means for adjusting said weights to balance the body being tested.

3. In a balancing machine, a drive spindle coupled to a body to be tested, a countershaft in axial alinement therewith, frictional coupling means for said shafts, a pair of counterbalance weights mounted on said countershaft and means for providing relative angular movement of said drive and countershafts.

4. In a balancing machine, a drive spindle coupled to a body to be tested, a countershaft in axial alinement therewith, frictional coupling means for said shafts, a plurality of counterbalance weights mounted on said countershaft and means for providing angular movement of said counterbalance weights relative to said body to be tested.

5. In a balancing machine, a drive spindle, coupled to a body to be tested, a countershaft in axial alinement therewith, coupling means for said shafts, a plurality of counterbalance weights mounted on said countershaft and a roller friction clutch for adjusting said weights relative to said body to be tested.

6. In a balancing machine, a drive spindle coupled to a body to be tested, a countershaft in axial alinement therewith, frictional coupling means for said shafts, a plurality of counterbalance weights mounted on said countershaft and means for effecting relative angular movement of said shafts in equal or opposite directions of rotation.

7. A balancing machine comprising an oscillatable bed, means for rotatably mounting a rotor thereon to be tested, a drive shaft coupled to said rotor, a countershaft journalled in axial alinement with said drive shaft, a friction coupling for said shafts, an adjustable counterweight mounted on said countershaft, a pair of friction discs mounted in proximity to the co-operating ends of said shaft, a hand lever pivotally mounted in alinement with said discs, a pair of friction cone journalled in said lever and adapted to engage said discs, and a differential gear associated with said shafts to indicate their relative angular positions.

8. A balancing machine comprising an oscillatable bed, means for rotatably mounting a rotor thereon to be tested, a drive shaft coupled to said rotor, a countershaft journalled in axial alinement with said drive shaft, a friction coupling for said shafts, an adjustable counterweight mounted on said countershaft, a pair of friction discs mounted in proximity to the co-operating ends of said shaft, a hand lever pivotally mounted in alinement with said discs, a plurality of friction cones journalled in said lever and adapted to engage said discs, a differential gear associated with said shafts to indicate their relative angular positions, means for indicating the degree of vibration of said bed and means for determining the relative amount and location of the unbalanced mass of the rotor.

9. The combination with a base member, of a movable bed supported thereon, means on said bed for rotatably mounting a body to be tested, means for counter-acting the dynamically unbalanced masses of said body, said counter-acting means comprising a pair of weights mounted in axial alinement with said body which are adapted to be angularly moved relative to the position of the unbalanced mass and a differential gear mechanism for indicating the angular position of said weights relative to said body.

10. The combination with a base member, of a movable bed supported thereon, means on said bed for rotatably mounting a body to be tested, means for counter-acting the dynamically unbalanced masses of said body, said counter-acting means comprising a pair of weights mounted in axial alinement with said test body which are adapted to be angularly moved relative to the position of the unbalanced mass and one of said weights being adapted for axial movement to produce a couple and a differential mechanism for indicating the angular position of said weights relative to said body.

11. The combination with a base member, of a movable bed supported thereby, flexible straps for connecting said bed to said base member, a fulcrum member disposed intermediate said bed and base movably mounted on the latter, means on said bed for rotatably mounting a body to be tested, and means for counter-acting the unbalanced mass of said body for any position of said fulcrum member.

12. The combination with a base member, of a movable bed supported thereby, a fulcrum member disposed intermediate said bed and base and movably mounted on the latter, means on said bed for rotatably mounting a body to be tested, and means for counter-acting the unbalanced mass of said body for any position of said fulcrum member, said last named means comprising a pair of symmetrical balance weights which are adapted to be angularly displaced simultaneously relative to the unbalanced mass of said body and one of said weights being axially movable relative to the said body.

In testimony whereof, I have hereunto subscribed my name this 21st day of May, 1924.

WILLIAM E. TRUMPLER.